United States Patent
Ansari et al.

(10) Patent No.: US 11,892,872 B2
(45) Date of Patent: Feb. 6, 2024

(54) TECHNIQUES FOR PROTECTION AND ACCURACY OF SYSTEM TIME

(71) Applicant: HARMAN INTERNATIONAL INDUSTRIES, INCORPORATED, Stamford, CT (US)

(72) Inventors: Asadullah Ansari, Karnataka (IN); Sharath Yadav Doddamane Hemantharaja, Karnataka (IN)

(73) Assignee: Harman International Industries, Incorporated, Stamford, CT (US)

( * ) Notice: Subject to any disclaimer, the term of this patent is extended or adjusted under 35 U.S.C. 154(b) by 321 days.

(21) Appl. No.: 17/171,974

(22) Filed: Feb. 9, 2021

(65) Prior Publication Data

US 2021/0247800 A1    Aug. 12, 2021

(30) Foreign Application Priority Data

Feb. 10, 2020 (IN) .............................. 202041005656

(51) Int. Cl.
*G06F 1/14* (2006.01)
*B60R 25/30* (2013.01)
(Continued)

(52) U.S. Cl.
CPC ................ *G06F 1/14* (2013.01); *B60R 25/30* (2013.01); *G05D 1/0088* (2013.01); *G05D 1/028* (2013.01);
(Continued)

(58) Field of Classification Search
CPC ........ G06F 1/14; G06F 9/4401; G06F 21/577; G06F 2221/034; G05D 1/0088; G05D 1/028; B60R 25/30
See application file for complete search history.

(56) References Cited

U.S. PATENT DOCUMENTS 6,742,048 B1    5/2004 Walsh
2004/0203951 A1 * 10/2004 Mazzara, Jr. ............ G06F 1/14
455/556.1
(Continued)

FOREIGN PATENT DOCUMENTS

CN    107493499 A  * 12/2017
CN    107493499 A    12/2017

OTHER PUBLICATIONS

Extended European Search Report for application No. 21156394.5 dated Jun. 14, 2021.

*Primary Examiner* — Jaweed A Abbaszadeh
*Assistant Examiner* — Hyun Soo Kim
(74) *Attorney, Agent, or Firm* — Artegis Law Group, LLP

(57) ABSTRACT

Techniques are disclosed for the protection and accuracy of system time used in systems, such as automotive systems, from attacks. In some embodiments, a cumulative trustworthiness score is determined for available time sources, other than a real time clock, by adding together trustworthiness scores associated with the available time sources after a system time is initialized to time of the real time clock during booting. The cumulative trustworthiness score is then used to determine an appropriate technique for updating the system time based on time from one of the available time sources, depending on whether the cumulative trustworthiness score is greater than a maximum threshold, between a minimum threshold and the maximum threshold, or less than the minimum threshold.

18 Claims, 5 Drawing Sheets

(51) Int. Cl.
    *G05D 1/00*          (2006.01)
    *G05D 1/02*          (2020.01)
    *G06F 21/57*         (2013.01)
    *G06F 9/4401*       (2018.01)

(52) U.S. Cl.
    CPC .......... *G06F 21/577* (2013.01); *G06F 9/4401* (2013.01); *G06F 2221/034* (2013.01)

(56) References Cited

U.S. PATENT DOCUMENTS

| | | | |
|---|---|---|---|
| 2006/0294593 A1* | 12/2006 | Eldar | G06F 21/725 |
| | | | 726/26 |
| 2007/0250734 A1 | 10/2007 | Thibadeau | |
| 2018/0183826 A1* | 6/2018 | Demi | H04W 12/12 |
| 2019/0116021 A1* | 4/2019 | Tanwar | H04J 3/0673 |
| 2019/0206153 A1* | 7/2019 | Antoni | G07C 5/00 |

\* cited by examiner

TECHNIQUES FOR PROTECTION AND ACCURACY OF SYSTEM TIME

CROSS-REFERENCE TO RELATED APPLICATIONS

This application claims the priority of co-pending India patent application titled, "TECHNIQUES FOR PROTECTION AND ACCURACY OF SYSTEM TIME" filed on Feb. 10, 2020 and having Serial No. 202041005656. The subject matter of this related application is hereby incorporated herein by reference.

BACKGROUND

Technical Field

The present disclosure relates generally to computing systems and, more specifically, to techniques for the protection and accuracy of system time in systems, such as automotive systems.

Description of the Related Art

System time is the current time and date that a computing system maintains so that applications running therein have ready access to accurate time for their operation. System time is typically based on the current time in relation to Greenwich, England, which is referred to as the coordinated universal time (UTC). Other time zones are ahead of or behind UTC time by a number of hours. System time is measured using a system clock, which is typically implemented as a count of the number of ticks that have transpired since an arbitrary starting date, which is referred to as the epoch. System time can also be converted into calendar time, which is more suitable for human comprehension.

In systems, such as automotive systems, many functionalities can be dependent on having an accurate system time. For example, advanced driver assistance systems (ADAS) typically perform actions such as applying emergency brakes, lane assist, collision avoidance, traffic sign recognition, cruise control, etc. based on a system time. An inaccurate system time can delay the response of an ADAS system, putting human lives at risk. As another example, cockpit systems such as browsers, media applications, payment applications, and over-the-air (OTA) software updates can rely on digital certificates or time frame-based paid services. An inaccurate system time can cause the unwanted expiration or extension of digital certificates or licensed services in such cockpit systems, which can also enable denial of service attacks. Accordingly, drift of a system time away from the legitimate UTC-based time, or a compromise of the system time due to a malicious attack, is generally undesirable.

As the foregoing illustrates, what is needed in the art are more effective techniques for the protection and accuracy of system time, such as in automotive systems.

SUMMARY

One embodiment of the present application sets forth a method for updating system time. The method includes determining a cumulative trustworthiness score based on one or more trustworthiness scores associated with respective one or more time sources. The method further includes updating a system time based on a time from one of the respective one or more time sources and the cumulative trustworthiness score.

Another embodiment of the present application sets forth a non-transitory computer-readable storage medium including instructions that, when executed by a processor, cause the processor to perform steps for updating system time. The steps include determining a cumulative trustworthiness score based on one or more trustworthiness scores associated with respective one or more time sources. The steps further include updating a system time based on a time from one of the respective one or more time sources and the cumulative trustworthiness score.

Another embodiment of the present application sets forth a system including a memory and a processor. The memory stores an application. The processor is coupled to the memory and, when executing the application, is configured to: determine a cumulative trustworthiness score based on one or more trustworthiness scores associated with respective one or more time sources; and update a system time based on a time from one of the respective one or more time sources and the cumulative trustworthiness score.

At least one technical advantage of the techniques disclosed herein relative to the prior art is that the disclosed techniques provide a reliable mechanism for updating system time and protecting the system time from attacks. In that regard, the disclosed techniques permit drift in and compromise of a system time to be identified, and the system time to be recovered based on time from available time sources, depending on the trustworthiness of those time sources. In addition, time values, including a default time and a recovery time, which can be used in the recovery process, are stored in a secure storage that is protected from attacks relative to some other types of storage. These technical advantages represent one or more technological improvements over prior art approaches.

BRIEF DESCRIPTION OF THE DRAWINGS

So that the manner in which the above recited features of this disclosure can be understood in detail, a more particular description of this disclosure may be had by reference to embodiments, some of which are illustrated in the appended drawings. It is to be noted, however, that the appended drawings illustrate only typical embodiments and are therefore not to be considered as limiting the scope of this disclosure, which may admit to other equally effective embodiments.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

System Overview

Figure 1:
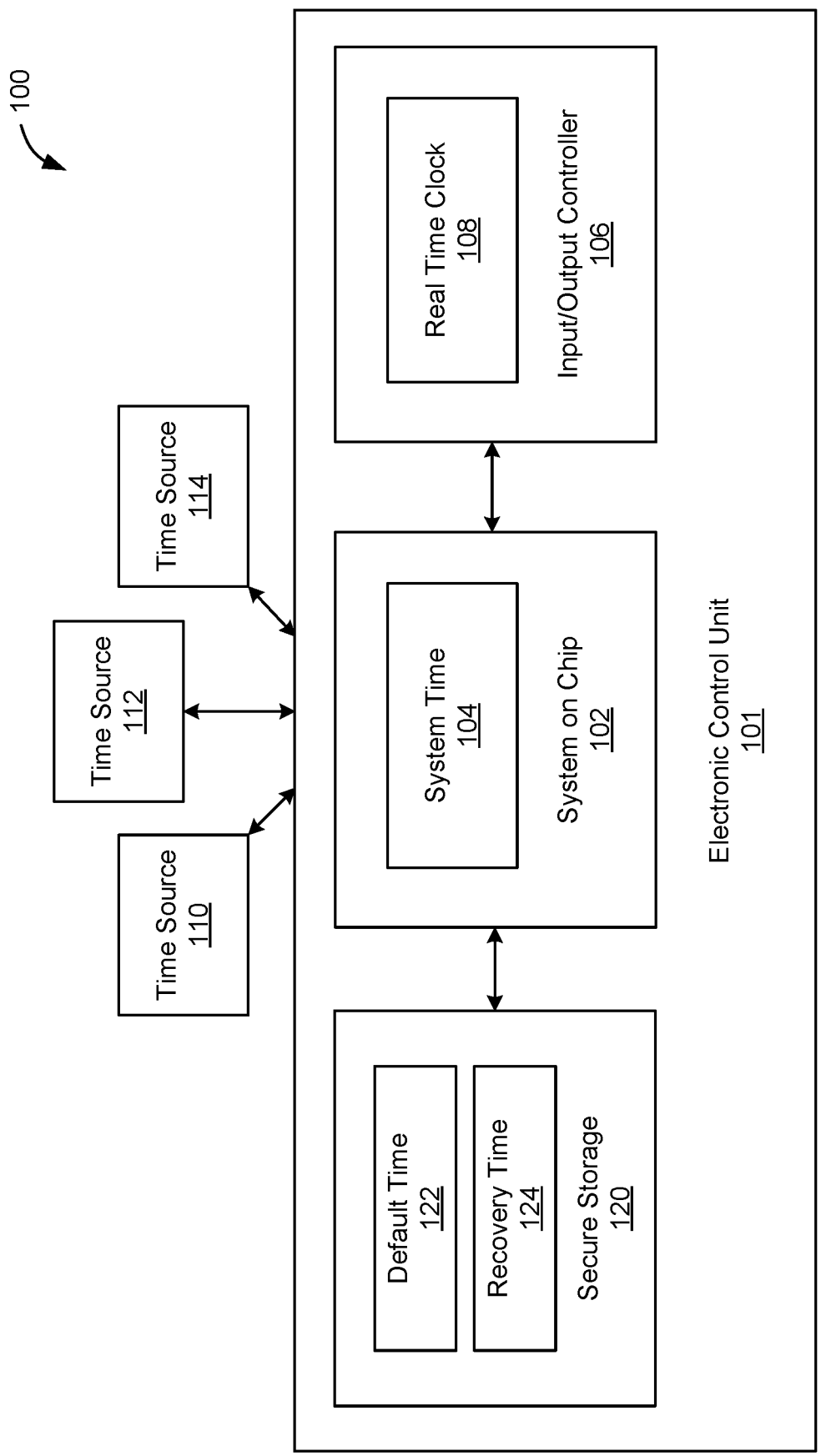
FIG. 1 illustrates a system configured to implement one or more aspects of the various embodiments.

FIG. 1 illustrates a system 100 configured to implement one or more aspects of the various embodiments. As shown, the system 100 includes an electronic control unit (ECU) 101 that is in communication with a number of time sources 110, 112, and 114. In some embodiments, the ECU 101 is an embedded automotive electronics system that can control one or more systems or subsystems in a vehicle. Although described herein with respect to automotive systems as a reference example, techniques disclosed herein for the protection and accuracy of system time may generally be used in any system that relies on a system time. Although one ECU 101 is shown for illustrative purposes, a vehicle (or other system) may generally include any number of ECUs, and the ECUs may also be in communication with each other. Although described herein primarily with respect to system time that is maintained by individual ECUs, in alternative embodiments, a central system time may be maintained for multiple ECUs.

Illustratively, the ECU 101 includes a system on chip (SOC) 102 that is in communication with an input-output controller (IOC) 106 and a secure storage 120. The SOC 102 can communicate with the IOC 106 and the secure storage 120 via one or more busses, network connections, and/or the like. As discussed in greater detail below in conjunction with FIG. 2, the SOC 102 can include any technically feasible hardware components, such as physical memory and one or more processors, that permit an application and/or other software to run therein. For example, in the automotive context, an application running in the SOC 102 could be associated with an automotive infotainment system provided via a head unit, an autonomous vehicle system, an advanced driver assistance system (ADAS), an intelligent traffic management system, a connected vehicles system, a vehicle-to-everything (V2X) communication system, a cockpit system, a telemetry system, a combination of the foregoing, or any other technically feasible automotive system that is time-dependent. Although described herein primarily with respect to an application as a reference example, other types of software, such as firmware or multiple applications, may run in an SOC in lieu of, or in addition to, an application, in some embodiments.

As shown, the SOC 102 includes a system time 104. In some embodiments, the system time 104 is maintained by the application (or other software) running in the SOC 102. As described, the system time 104 may be used for various purposes by different applications. For example, an application running in the SOC 102 could be associated with a cockpit system and need to determine whether a digital certificate or time frame-based paid service is valid based on the system time 104. As another example, the application could be associated with an ADAS system and perform actions such as applying emergency brakes, lane assist, collision avoidance, traffic sign recognition, cruise control, etc. based on the system time 104, etc.

The IOC 106 is a device that interfaces between input or output device(s), such as a vehicle network interface device, and the SOC 102. Although shown as being separate from the SOC 102, in alternative embodiments, the SOC 102 and the IOC 106 may be combined into one hardware unit with software running therein. As shown, the IOC 106 provides a time from a real time clock (RTC) 108 included therein. In alternative embodiments, the RTC 108 may be located elsewhere, such as in the SOC 102 rather than the IOC 106, and an ECU may also include more than one RTC in some embodiments. In some embodiments, the RTC 108 is a battery powered source of time that can continue to keep time when a primary power source is off or unavailable. As described in greater detail below in conjunction with FIG. 3, time maintained by the RTC 108 can be shared with the SOC 102 via inter-process communication, and the shared time can be used to initialize the system time 104 during booting. In the automotive context, "booting" refers to the starting of a vehicle, which in turn boots ECU(s) and application(s) running therein. In other embodiments, the booting may be of any system that relies on a system time. Subsequent to booting, the system time 104 can be updated to correspond to the legitimate UTC-based time, which is also referred to herein as "recovering" the system time 104, based on other available time sources, if any, which may be more trustworthy than the RTC 108. It should be noted that the availability of new time sources with higher trustworthiness scores aids in the speed of the recovery process.

As shown, the secure storage 120 stores a default time 122 and a recovery time 124. In some embodiments, the secure storage 120 may be a replay protected memory block (RPMB), or any other type of secure hardware and/or software storage. The secure storage 120 can protect data stored therein, including the default time 122 and the recovery time 124, from some forms of attack. The default time 122 is a time written by a manufacturer into the secure storage 120 and the RTC 108, and such a default time may be used as a default for the system time 104 when all other sources of time are unavailable. In some embodiments, the default time 122 is a time when an application that runs in the SOC 102 is built. In other embodiments, the default time 122 may be any suitable time chosen by the manufacturer, such as a manufacturing time. As discussed in greater detail below in conjunction with FIG. 3, the default time 122 can be compared with time from the RTC 108 and the recovery time 124, and a maximum of the default time 122, the RTC 108 time, and the recovery time 124 selected to initialize the system time 104, during booting. The recovery time 124 is an amount of time that is added to the system time 104 at a predefined frequency during a recovery process to nullify a difference in time between the system time 104 and the time from a time source (e.g., one of the time sources 110, 112, or 114), as discussed in greater detail below in conjunction with FIGS. 3-5. The recovery time 124 defines the rate of recovery when the recovery process is performed.

The time sources 110, 112, and 114 are sources of time external to the ECU 101 that, when available, can be used to recover the system time 104. Examples of time sources include the Google® Public NTP (Network Time Protocol), GPS (Global Positioning System), telematics time from a TBM (telematics box module), a radio time source, etc. The ECU 101 may communicate with the time sources 110, 112, and 114 in any technically feasible manner. For example, a network interface card could be used to communicate with the Google® Public NTP, a radio receiver could be used to communicate with a radio time source, the ECU 101 could obtain time from a time source indirectly via, e.g., another ECU, etc. Although three time sources 110, 112, and 114 are shown for illustrative purposes, systems such as the ECU 101 may generally communicate with any number of time sources.

Figure 2:
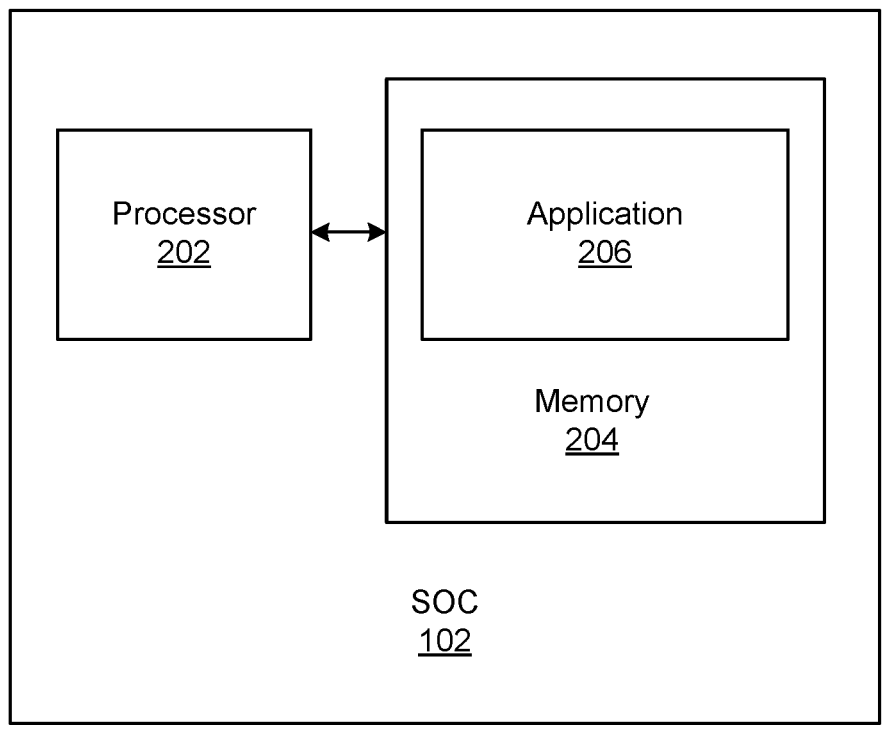
FIG. 2 illustrates in greater detail the system on chip of FIG. 1, according to various embodiments.

FIG. 2 illustrates in greater detail the SOC 102 of FIG. 1, according to various embodiments. As shown, the SOC 102 includes a processor 202 and a memory 204. An application 206 is stored in the memory 204 and executes on the processor 202. For example, in the context of automobile systems, the application 206 could be associated with an automotive infotainment system, an autonomous vehicle system, an advanced driver assistance system (ADAS), an intelligent traffic management system, a connected vehicles system, a vehicle-to-everything (V2X) communication system, a cockpit system, or a telemetry system.

Although shown as a system on chip for illustrative purposes, it should be understood that the SOC 102 is not required to be a system on chip and may generally include any type of computing system. The processor 202 is included to be representative of a single central processing unit (CPU), multiple CPUs, a single CPU having multiple processing cores, one or more graphics processing units (GPUs), field-programmable gate arrays (FPGAs), other types of processors, some combination of the foregoing, and the like. In operation, the processor 202 may control and coordinate the operations of other system components. The processor 202 may further receive user input from input devices, such as a touchscreen.

The system memory 204 of the SOC 102 stores content, such as software applications and data, for use by the processor 202. The system memory 204 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 204. The storage may include any number and type of external memories that are accessible to the processor 202. For example, and without limitation, the storage may include a Secure Digital Card, an external Flash memory, a portable compact disc read-only memory (CD-ROM), an optical storage device, a magnetic storage device, or any suitable combination of the foregoing.

Figure 4:
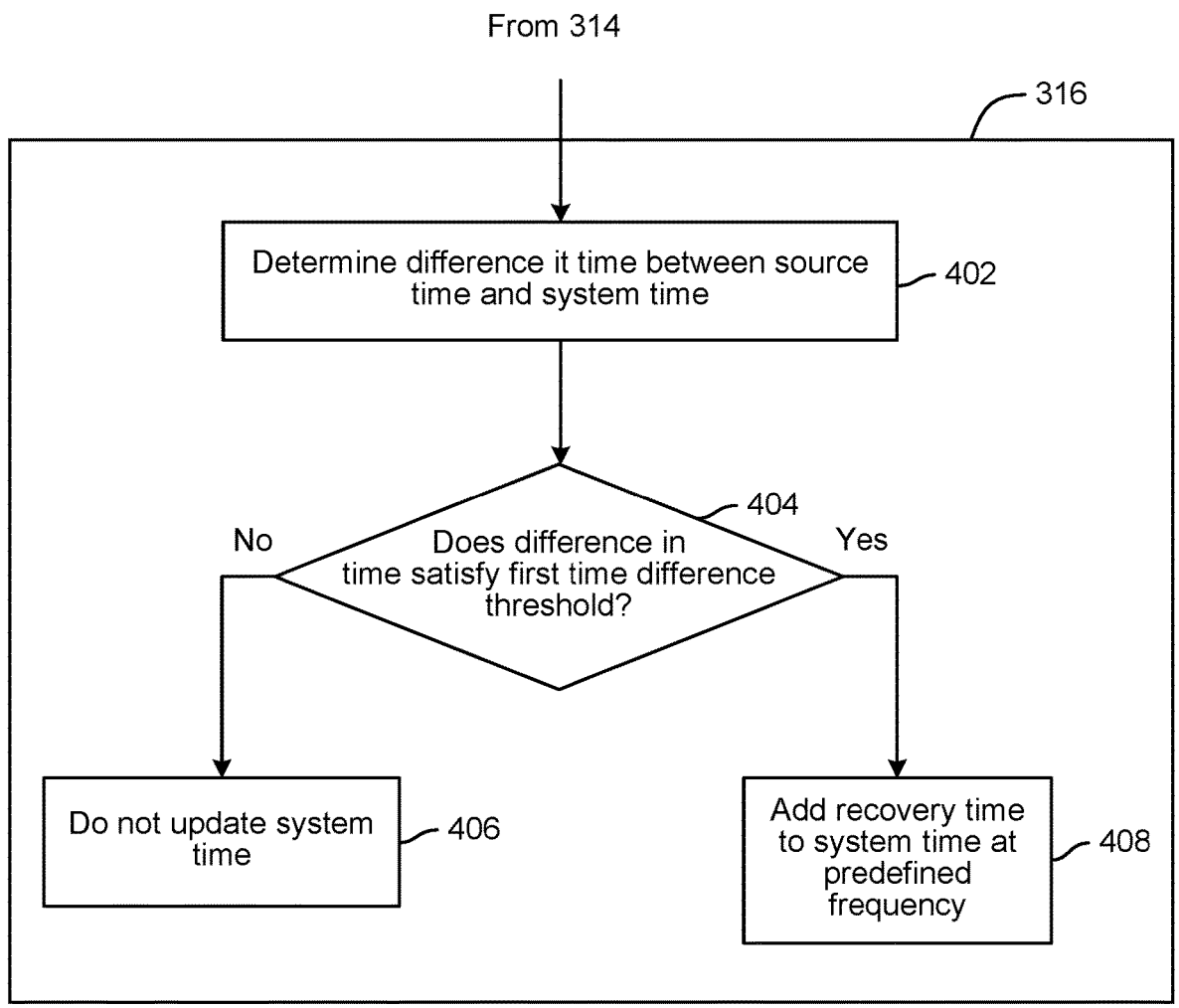
FIG. 4 is a more detailed illustration of one of the method steps of FIG. 3, according to various embodiments.
Figure 5:
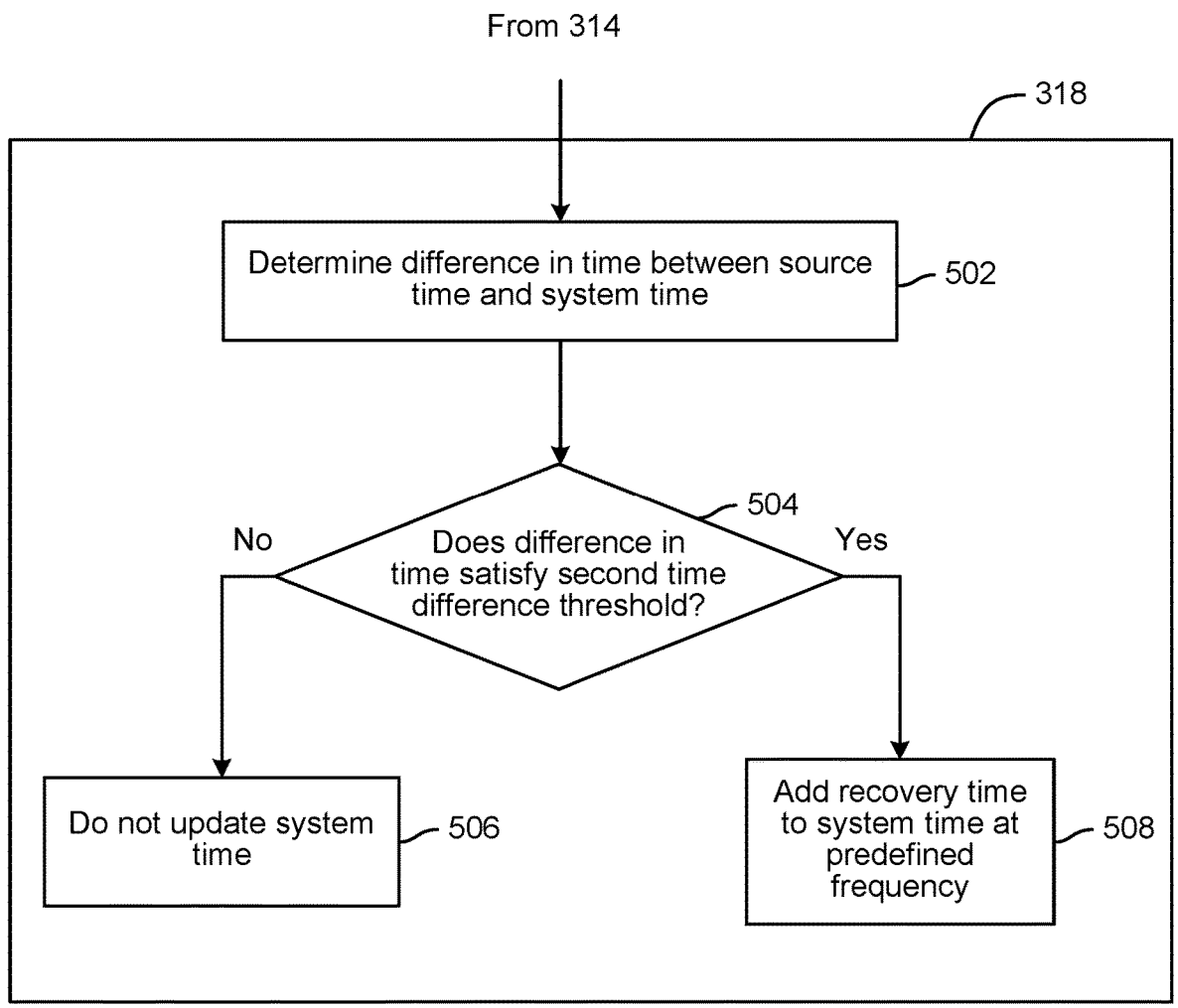
FIG. 5 is a more detailed illustration of another of the method steps of FIG. 3, according to various embodiments.

As discussed in greater detail below in conjunction with FIGS. 3-5, time maintained by the RTC 108 is restored in the system memory 204 as a default system time 104 during booting. Thereafter, the system time 104 can be updated based on the time of available time sources other than the RTC 108 (e.g., the time sources 110, 112, and 114), which are also referred to herein as "available time sources," and trustworthiness scores associated with the same. Each trustworthiness score associated with an available time source is derived based on an attack surface of the time source. In some embodiments, a risk analysis is performed for each of a number of potentially available time sources to determine associated trustworthiness scores, and the application 206 is programmed to either update the system time 104 directly with time from an available time source, or perform an iterative recovery technique using time from an available time source and the recovery time 124, depending on a cumulative trustworthiness score that is a sum of trustworthiness scores associated with the available time sources. During the risk analysis of a time source, a threat analysis and risk assessment (TARA) may be performed using an E-Safety Vehicle Intrusion Protected Applications (EVITA) model to determine the trustworthiness score associated with the time source based on, e.g., hardware and software components associated with the time source and potential threats to the time source. In such a case, a higher trustworthiness score indicates that a time source has a smaller attack surface, and greater trustworthiness, relative to other time sources. In some embodiments, the trustworthiness scores may be in the range of 0 to 65 when the total number of available time sources is less than or equal to five. For example, risk analysis using the TARA methodology and an EVITA model could produce trustworthiness scores of 65, 60, 30, and 20 for the Google® Public NTP, GPS, and telematics time from TBM, and radio time sources described above, respectively.

During runtime, not all time sources may be available, so the number of available time sources is generally not fixed. For example, GPS could be unavailable during cloudy weather conditions, underground, within buildings, etc. As another example, an NTP time source may be unavailable if the SOC 102 does not have network connectivity required to obtain time from the NTP source. In some embodiments, the SOC 102 is configured to, after initiating the system time 104 as a time retrieved from the RTC 108 during booting, determine a cumulative trustworthiness score for available time sources by summing the trustworthiness scores associated with those time sources. In such cases, the SOC 102 either (1) updates the system time 104 with a time (and date) of any of the available time sources if the cumulative trustworthiness score satisfies a maximum threshold, (2) executes an iterative recovery technique if the cumulative trustworthiness score is between a minimum threshold and a maximum threshold and a difference in time between the system time 104 and one of the available time sources satisfies a first time difference threshold, or (3) executes the iterative recovery technique if the cumulative trustworthiness score is less than a minimum threshold and a difference in time between the system time 104 and one of the available time sources satisfies a second time difference threshold that is smaller than the first time difference threshold.

Although discussed herein primarily with respect to the SOC 102, it should be noted that functionalities attributed to the SOC 102 may actually be performed by the application 206 executing therein. Further, it will be appreciated that the SOC 102 shown herein is illustrative and that variations and modifications are possible. For example, the number of processors 202, the number of system memories 204, and the number of applications and/or other software (e.g., firmware) included in the system memory 204 may be modified as desired. Further, the connection topology between the various units in FIGS. 1 and 2 may be modified as desired. In some embodiments, any combination of the processor 202 and the system memory 204 may be replaced with any type of virtual computing system, distributed computing system, or cloud computing environment. Further, the functionality included in any applications may be divided across any number of applications or other software that are stored and executed via any number of devices that are located in any number of physical locations.

Protection and Accuracy of System Time

Figure 3:
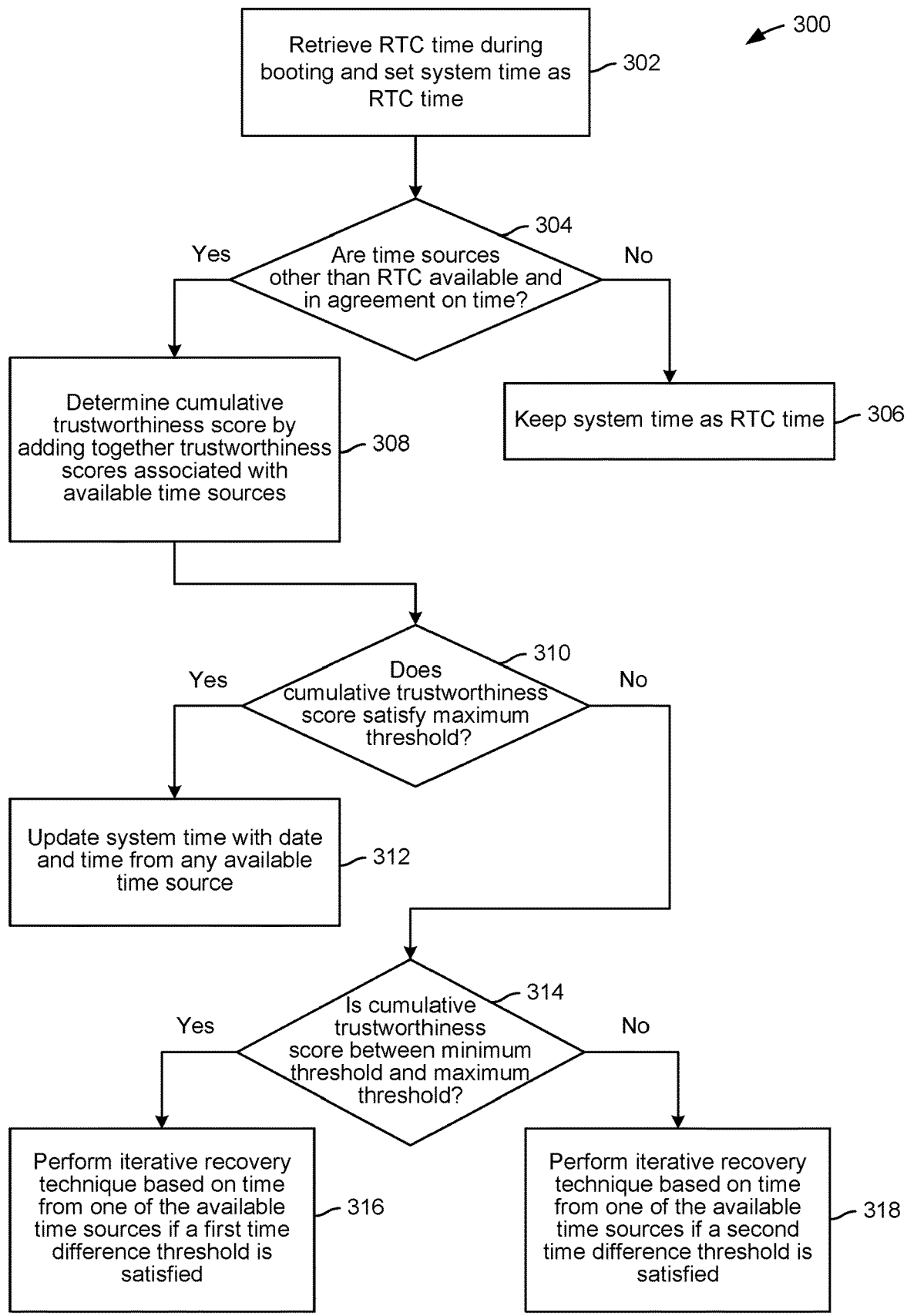
FIG. 3 sets forth a flow diagram of method steps for updating system time, according to various embodiments.

FIG. 3 sets forth a flow diagram of method steps for updating the system time 104, according to various embodiments. Although the method steps are described with reference to the system of FIGS. 1-2, persons skilled in the art will understand that any system configured to implement the method steps, in any order, falls within the scope of the present invention.

As shown, a method 300 begins at step 302, where the SOC 102 retrieves a time of the RTC 108 during booting and sets the system time 104 to be the RTC time. As described, the RTC 108 is a battery powered source of time that can be shared by the IOC 106 with the SOC 102 via inter-process communication. The RTC time is used as a default for the system time 104 during the initial stages of booting, as other time sources may still be unavailable. Although described herein primarily with respect to the RTC 108, in alternative embodiments other types of clocks, such as a software-based clock, may be used to initialize the system time 104 during booting.

In some embodiments, the RTC time may also be compared to the default time 122 and the recovery time 124 stored in the secure storage 120, and the maximum of the three times can be set as the system time 104 during booting. As described, the default time 122 can be retrieved from the secure storage 120 and used when no other time sources are available.

Subsequent to booting, the system time 104 can be updated using time from time source(s) other than the RTC 108 that are available. At step 304, the SOC 102 determines, after booting, whether there are available time sources other than the RTC 108, and whether the available time sources (if any) agree on time. The available time sources may include the Google® Public NTP, GPS, telematics time from a TBM, a radio time source, etc., and the number of available time sources is generally not fixed. For example, GPS may be unavailable in cloudy weather conditions, underground, within buildings, etc, an NTP source may be unavailable if the SOC 102 does not have network connectivity, etc. Although described herein primarily with respect to establishing the system time 104 during and after the booting process, in some embodiments, the system time 104 may also be updated thereafter (e.g., periodically) based on available time sources.

If there are no other available time sources or the available time sources do not agree on time, then at step 306, the SOC 102 keeps the system time as the RTC time. In some embodiments, times from the available time sources are required to agree up to a threshold of tolerance, such as a predefined number of seconds. If the time from any available time source differs from that of another time source by more than such a threshold, then one of those time sources is considered to be compromised. In such cases, the system time 104 is not updated based on any of the available time sources, as the SOC 102 may be unable to determine which time source is compromised.

On the other hand, if there are other available time sources and the time sources are in agreement, then at step 308, the SOC 102 determines a cumulative trustworthiness score by adding together trustworthiness scores associated with the available time sources. For example, assuming GPS and radio time sources are available and have trustworthiness scores of 60 and 20, respectively, then the cumulative trustworthiness score could be computed as $$CTS=(TS)_{GPS}+(TS)_{Radio},$$

$$CTS=60+20=80,$$

where CTS is the cumulative trustworthiness score, $(TS)_{GPS}$ is the trustworthiness score associated with GPS, and $(TS)_{Radio}$ is the trustworthiness score associated with a radio time source. It should be noted that the RTC 108 is not considered an available time source whose trustworthiness score needs to be included in computing the cumulative trustworthiness score, as the RTC time is only used as a default for the system time when no other time sources are available. After other time sources become available, the cumulative trustworthiness score is computed by adding together trustworthiness scores associated with the other (available) time sources. As described, individual trustworthiness scores for corresponding time sources can be determined at manufacturing time by performing a risk analysis for each of a number of potentially available time sources, such as an analysis using the TARA methodology and an EVITA model. However, as the number of available time sources is not generally fixed (e.g., GPS may be unavailable, etc.), the cumulative trustworthiness score needs to be determined at runtime at step 308.

As shown, at step 310, the SOC 102 determines whether the cumulative trustworthiness score satisfies a maximum threshold for the cumulative trustworthiness score. To ensure that the system time 104 can be updated safely and reliably, a maximum and a minimum threshold for the cumulative trustworthiness score are used in embodiments to determine an appropriate manner for updating the system time 104. Values for such thresholds can be experimentally determined based on, e.g., what value of the cumulative trustworthiness score is required to trust time sources, as discussed in greater detail below in conjunction with FIGS. 4-5.

In some embodiments, satisfying the maximum threshold at step 310 requires $CTS>=CTS_{Thr-max}$, where $CTS_{Thr-max}$ is the maximum threshold for the cumulative trustworthiness score. In some embodiments, the SOC 102 can use a maximum threshold of 80 and a minimum threshold of 60 for the cumulative trustworthiness score. Returning to the example above, the cumulative trustworthiness score of 80 for the GPS and radio time sources would satisfy a maximum threshold of 80, indicating maximal confidence in the GPS and radio time sources.

If the SOC 102 determines that the cumulative trustworthiness score satisfies the maximum threshold, then at step 312, the SOC 102 updates the system time 104 with the time (and date) from any of the available time sources. In some embodiments, in addition to updating the system time at step 312, the time of the RTC 108 can also be updated with the same time of the external source that is used to update the system time 104. Doing so allows the updated time of the RTC 108 to be used during future booting.

On the other hand, if the SOC 102 determines that the cumulative trustworthiness score does not exceed the maximum threshold, then at step 314, the SOC 102 determines whether the cumulative trustworthiness score is between a minimum threshold and the maximum threshold for the cumulative trustworthiness score. In some embodiments, determining that the cumulative trustworthiness score is between the minimum threshold and the maximum threshold requires $CTS>=CTS_{Thr-min}$ & $CTS<CTS_{Thr-max}$, where CTS is the cumulative trustworthiness score, $CTS_{Thr-min}$ is the minimum threshold, and $CTS_{Thr-max}$ is a maximum threshold. In some embodiments, the SOC 102 could use a maximum threshold of 80 and a minimum threshold of 60. Any cumulative trustworthiness score between the minimum and maximum thresholds indicates minor confidence in trustworthiness of the available time sources. Any cumulative trustworthiness score that is less than the minimum threshold indicates minimal confidence in trustworthiness of the available time sources.

If the SOC 102 determines that the cumulative trustworthiness score is between the minimum threshold and the maximum threshold, then at step 316, the SOC 102 performs an iterative recovery technique based on a time (and date) from one of the available time sources if a first time difference threshold is satisfied. Step 316 of the method 300 is illustrated in greater detail in conjunction FIG. 4. As shown, at step 402, the SOC 102 determines a difference in time between a source time and the system time. The difference in time, which is also referred to as a time delta, is always positive and may be determined by, e.g., taking an absolute value of the source time minus the system time (or vice versa). Time from any of the available time sources may be used as the source time, as the times from the available time sources were determined to agree at step 304 of the method 300, described above in conjunction with FIG. 3.

At step 404, the SOC 102 determines whether the difference in time between the source time and the system time 104 is greater than a first time difference threshold. The value of the first time difference threshold is chosen such that, when the difference in time is greater than the first time difference threshold, the system time 104 is assumed to have been compromised and to require recovery. In some embodiments, the SOC 102 can use a first time difference threshold having a value from 0 to 5 seconds. More generally, the SOC 102 can use any suitable value for the first time difference threshold, and the particular value of the first time difference threshold that is used can be determined experimentally.

If the difference in time is not greater than the first time difference threshold, then at step 406, the SOC 102 does not update the system time 104. On the other hand, if the difference in time is greater than the first time difference threshold, then at step 408, the SOC 102 adds the recovery time 124 to the system time 104 at a predefined frequency. In some embodiments, the recovery time 124 has a value between the first and second time difference thresholds described above, $T_{th1} < T_{recovery\_time} < T_{th2}$, where $T_{recovery\_time}$ is the recovery time, $T_{th1}$ is the first time difference threshold, and $T_{th2}$ is the second time difference threshold. In some embodiments, the SOC 102 retrieves the recovery time 124 from the secure storage 120 and adds the recovery time 124 to the system time 104 at the predefined frequency until the difference in time between the source time and the system time 104 is nullified (e.g., by reducing the difference in time completely or below some threshold of tolerance). For example, the application 206 could be programmed to add the recovery time 124 to the system time 104 a given number of times per minute, until the difference in time is nullified. Although described herein primarily with respect to adding as an illustrative example, it should be understood that the recovery time 124 may effectively be subtracted from the system time 104 in cases where the source time is later than the system time 104.

Returning to FIG. 3, if the SOC 102 determines that the cumulative trustworthiness score is less than the minimum threshold for the cumulative trustworthiness score, indicating minimal confidence in the trustworthiness of the available time sources, then at step 318, the SOC 102 performs an iterative recovery technique based on a time (and date) from one of the available time sources if a second time difference threshold is satisfied. Step 316 of the method 300 is shown in greater detail in FIG. 5. As shown, at step 502, the SOC 102 determines a difference in time between the source time and the system time 104. As described above in conjunction with FIG. 4, any of the available source time source may be used as the source time, as the available time sources were determined to agree in time at step 304 of the method 300.

At step 504, the SOC 102 determines whether the difference in time is greater than the second time difference threshold. Step 504 is similar to step 404, described above in conjunction with FIG. 4, except that a second time difference threshold is used rather than the first time difference threshold. In some embodiments, the second time difference threshold is less than the first time difference threshold, as the available time sources are less trustworthy in the case where the cumulative trustworthiness score is determined to be less than the minimum threshold at step 314 of the method 300, requiring a lesser threshold to compensate for the less trustworthy time sources. In some embodiments, the SOC 102 can use a second time difference threshold having a value in the range of 0 to 15 seconds. More generally, the SOC 102 can use any suitable second time difference threshold, and the particular value of the second time difference threshold may be determined experimentally.

If the difference in time is not greater than the second time difference threshold, then at step 506, the SOC 102 does not update the system time. On the other hand, if the difference in time is greater than the second time difference threshold, then at step 508, the SOC 102 adds the recovery time 124 to the system time 104 at a predefined frequency. Similar to step 406 described above in conjunction with FIG. 4, in some embodiments the SOC 102 retrieves the recovery time 124 from the secure storage 120 and adds the recovery time 124 to the system time 104 at a predefined frequency until the difference in time between the source time and the system time 104 is nullified. For example, the recovery time 124 could be added to the system time 104 a given number of times per minute.

In sum, techniques are disclosed for the protection and accuracy of system time used in systems, such as automotive systems. In the disclosed techniques, a cumulative trustworthiness score is determined for available time sources, other than a real time clock, by adding together trustworthiness scores associated with the available time sources after a system time is initialized to time of the real time clock during booting. The cumulative trustworthiness score is then used to determine an appropriate technique for updating the system time based on the available time sources. If the cumulative trustworthiness score is greater than a maximum threshold, then the system time is updated with the time (and date) of any of the available time sources. If the cumulative trustworthiness score is between a minimum threshold and the maximum threshold and a difference in time between time from one of the available time sources and the system time is greater than a first time difference threshold, then the system time is updated via an iterative recovery technique in which a recovery time is added to the system time at a predefined frequency until the difference in time between the time from the one of the available time sources and the system time is nullified. If the cumulative trustworthiness score is below the minimum threshold and a difference in time between time from one of the available time sources and the system time is greater than a second time difference threshold that is less than the first time difference threshold, then the system time is updated via the same iterative recovery technique in which a recovery time is added to the system time at a predefined frequency until the difference in time between the time from the one of the available time sources and the system time is nullified.

At least one technical advantage of the techniques disclosed herein relative to the prior art is that the disclosed techniques provide a reliable mechanism for updating system time and protecting the system time from attacks. In that regard, the disclosed techniques permit drift in and compromise of a system time to be identified, and the system time to be recovered based on time from available time sources, depending on the trustworthiness of those time sources. In addition, time values, including a default time and a recovery time, which can be used in the recovery process, are stored in a secure storage that is protected from attacks relative to some other types of storage. These technical advantages represent one or more technological improvements over prior art approaches.

1. In some embodiments, a method for updating system time comprises determining a cumulative trustworthiness score based on one or more trustworthiness scores associated with respective one or more time sources, and updating a system time based on a time from one of the respective one or more time sources and the cumulative trustworthiness score.

2. The method of clause 1, wherein updating the system time comprises, if the cumulative trustworthiness score is greater than a first threshold, setting the system time equal to the time from the one of the time sources, if the cumulative trustworthiness score is less than the first threshold but greater than a second threshold and a difference in time between the system time and the time from the one of the time sources is greater than a third threshold, performing an iterative recovery technique using the time from the one of the time sources, and if the cumulative trustworthiness score is less than the second threshold and the difference in time between the system time and the time from the one of the time sources is greater than a fourth threshold, performing the iterative recovery technique using the time from the one of the time sources.

3. The method of clauses 1 or 2, wherein the fourth threshold is greater than the third threshold.

4. The method of any of clauses 1-3, wherein performing the iterative recovery technique comprises adding a recovery time to the system time at a predefined frequency.

5. The method of any of clauses 1-4, wherein determining the cumulative trustworthiness score comprises summing the one or more trustworthiness scores associated with the respective one or more time sources.

6. The method of any of clauses 1-5, further comprising determining the one or more trustworthiness scores based on risk analyses of the time sources.

7. The method of any of clauses 1-6, wherein each of the risk analyses is a threat analysis and risk assessment (TARA) performed using an E-safety Vehicle Intrusion Protected Applications (EVITA) model.

8. The method of any of clauses 1-7, further comprising initializing the system time to a maximum of a time from a real time clock, a default time, and a recovery time.

9. The method of any of clauses 1-8, further comprising, prior to updating the system time, determining that times from the respective one or more time sources are within a threshold time of each other.

10. The method of any of clauses 1-9, wherein the time sources include at least one of a Network Time Protocol (NTP) time source, a Global Positioning System (GPS) time source, a telematics time source, a radio time source, or a real time clock time source.

11. In some embodiments, a non-transitory computer-readable storage medium includes instructions that, when executed by a processor, cause the processor to perform steps for updating system time, the steps comprising determining a cumulative trustworthiness score based on one or more trustworthiness scores associated with respective one or more time sources, and updating a system time based on a time from one of the respective one or more time sources and the cumulative trustworthiness score.

12. The computer-readable storage medium of clause 11, wherein the system time is maintained by an automotive system.

13. The computer-readable storage medium of clauses 11 or 12, wherein the automotive system is one of an automotive infotainment system, an autonomous vehicle system, an advanced driver assistance system (ADAS), an intelligent traffic management system, a connected vehicles system, a vehicle-to-everything (V2X) communication system, a cockpit system, or a telemetry system.

14. The computer-readable storage medium of any of clauses 11-13, wherein updating the system time comprises if the cumulative trustworthiness score is greater than a first threshold, setting the system time equal to the time from the one of the time sources, if the cumulative trustworthiness score is less than the first threshold but greater than a second threshold and a difference in time between the system time and the time from the one of the time sources is greater than a third threshold, performing an iterative recovery technique using the time from the one of the time sources, and if the cumulative trustworthiness score is less than the second threshold and the difference in time between the system time and the time from the one of the time sources is greater than a fourth threshold, performing the iterative recovery technique using the time from the one of the time sources.

15. The computer-readable storage medium of any of clauses 11-14, wherein the fourth threshold is greater than the third threshold.

16. The computer-readable storage medium of any of clauses 11-15, wherein performing the iterative recovery technique comprises adding a recovery time to the system time at a predefined frequency, and wherein the recovery time is stored in a secure storage.

17. The computer-readable storage medium of any of clauses 11-16, wherein determining the cumulative trustworthiness score comprises summing the one or more trustworthiness scores associated with the respective one or more time sources.

18. The computer-readable storage medium of any of clauses 11-17, the steps further comprising initializing the system time to a maximum of a time from a real time clock, a default time, and a recovery time.

19. In some embodiments, a system comprises a memory storing an application, and a processor that is coupled to the memory and, when executing the application, is configured to determine a cumulative trustworthiness score based on one or more trustworthiness scores associated with respective one or more time sources, and update a system time based on time from one of the respective one or more time sources and the cumulative trustworthiness score.

20. The system of clause 19, wherein updating the system time comprises if the cumulative trustworthiness score is greater than a first threshold, setting the system time equal to the time from the one of the time sources, if the cumulative trustworthiness score is less than the first threshold but greater than a second threshold and a difference in time between the system time and the time from the one of the time sources is greater than a third threshold, performing an iterative recovery technique using the time from the one of the time sources, and if the cumulative trustworthiness score is less than the second threshold and the difference in time between the system time and the time from the one of the time sources is greater than a fourth threshold, performing the iterative recovery technique using the time from the one of the time sources, wherein the fourth threshold is greater than the third threshold.

Any and all combinations of any of the claim elements recited in any of the claims and/or any elements described in this application, in any fashion, fall within the contemplated scope of the present disclosure and protection.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices. The described methods and associated actions may also be performed in various orders in addition to the order described in this application, in parallel, and/or simultaneously. The described systems are exemplary in nature, and may include additional elements and/or omit elements.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects.

The embodiments of the present disclosure generally provide for a plurality of circuits, electrical devices, and/or at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

A block is understood to be a hardware system or an element thereof with at least one of: a processing unit executing software and a dedicated circuit structure for implementing a respective desired signal transferring or processing function. Thus, parts or all of the system may be implemented as software and firmware executed by a processor or a programmable digital circuit. It is recognized that any system as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any system as disclosed may utilize any one or more microprocessors to execute a computer-program that is embodied in a non-transitory computer readable medium that is programmed to perform any number of the functions as disclosed. Further, any controller as provided herein includes a housing and a various number of microprocessors, integrated circuits, and memory devices, (e.g., FLASH, random access memory (RAM), read only memory (ROM), electrically programmable read only memory (EPROM), and/or electrically erasable programmable read only memory (EEPROM).

While various embodiments of the invention have been described, it will be apparent to those of ordinary skilled in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof.

What is claimed is:

1. A method for updating system time, the method comprising:

determining a cumulative trustworthiness score based on one or more trustworthiness scores associated with respective one or more time sources;

determining whether to update a system time based on a difference in time between the system time and a time from a first time source of the respective one or more time sources and the cumulative trustworthiness score; and in response to determining to update the system time, updating the system time based on the time from the first time source, wherein:

if the cumulative trustworthiness score is greater than a first threshold, setting the system time equal to the time from the first time source;

if the cumulative trustworthiness score is less than the first threshold but greater than a second threshold and the difference in time between the system time and the time from the first time source is greater than a third threshold, performing an iterative recovery technique using the time from the first time source; and if the cumulative trustworthiness score is less than the second threshold and the difference in time between the system time and the time from the first time source is greater than a fourth threshold, performing the iterative recovery technique using the time from the first time source.

2. The method of claim 1, wherein the fourth threshold is greater than the third threshold.

3. The method of claim 1, wherein performing the iterative recovery technique comprises adding a recovery time to the system time at a predefined frequency.

4. The method of claim 1, wherein determining the cumulative trustworthiness score comprises summing the one or more trustworthiness scores associated with the respective one or more time sources.

5. The method of claim 1, further comprising determining the one or more trustworthiness scores based on risk analyses of the respective one or more time sources.

6. The method of claim 5, wherein each of the risk analyses is a threat analysis and risk assessment (TARA) performed using an E-safety Vehicle Intrusion Protected Applications (EVITA) model.

7. The method of claim 1, further comprising initializing the system time to a maximum of a time from a real time clock, a default time, and a recovery time.

8. The method of claim 1, further comprising, prior to updating the system time, determining that times from the respective one or more time sources are within a threshold time of each other.

9. The method of claim 1, wherein the one or more time sources include at least one of a Network Time Protocol (NTP) time source, a Global Positioning System (GPS) time source, a telematics time source, a radio time source, or a real time clock time source.

10. A non-transitory computer-readable storage medium including instructions that, when executed by a processor, cause the processor to perform steps for updating system time, the steps comprising:
 determining a cumulative trustworthiness score based on one or more trustworthiness scores associated with respective one or more time sources;
 determining whether to update a system time based on a difference in time between the system time and a time from a first time source of the respective one or more time sources and the cumulative trustworthiness score; and
 in response to determining to update the system time, updating the system time based on the time from the first time source, wherein:
  if the cumulative trustworthiness score is greater than a first threshold, setting the system time equal to the time from the first time source;
  if the cumulative trustworthiness score is less than the first threshold but greater than a second threshold and the difference in time between the system time and the time from the first time source is greater than a third threshold, performing an iterative recovery technique using the time from the first time source; and
  if the cumulative trustworthiness score is less than the second threshold and the difference in time between the system time and the time from the first time source is greater than a fourth threshold, performing the iterative recovery technique using the time from the first time source.

11. The computer-readable storage medium of claim 10, wherein the system time is maintained by an automotive system.

12. The computer-readable storage medium of claim 11, wherein the automotive system is one of an automotive infotainment system, an autonomous vehicle system, an advanced driver assistance system (ADAS), an intelligent traffic management system, a connected vehicles system, a vehicle-to-everything (V2X) communication system, a cockpit system, or a telemetry system.

13. The computer-readable storage medium of claim 10, wherein the fourth threshold is greater than the third threshold.

14. The computer-readable storage medium of claim 10, wherein performing the iterative recovery technique comprises adding a recovery time to the system time at a predefined frequency, and wherein the recovery time is stored in a secure storage.

15. The computer-readable storage medium of claim 10, wherein determining the cumulative trustworthiness score comprises summing the one or more trustworthiness scores associated with the respective one or more time sources.

16. The computer-readable storage medium of claim 10, the steps further comprising initializing the system time to a maximum of a time from a real time clock, a default time, and a recovery time.

17. A system, comprising:
 a memory storing an application; and
 a processor that is coupled to the memory and, when executing the application, is configured to:
  determine a cumulative trustworthiness score based on one or more trustworthiness scores associated with respective one or more time sources,
  determine whether to update a system time based on a difference in time between the system time and a time from a first time source of the respective one or more time sources and the cumulative trustworthiness score, and
  in response to determining to update the system time, update the system time based on the time from the first time source, wherein:
   if the cumulative trustworthiness score is greater than a first threshold, setting the system time equal to the time from the first time source;
   if the cumulative trustworthiness score is less than the first threshold but greater than a second threshold and the difference in time between the system time and the time from the first time source is greater than a third threshold, performing an iterative recovery technique using the time from the first time source; and
   if the cumulative trustworthiness score is less than the second threshold and the difference in time between the system time and the time from the first time source is greater than a fourth threshold, performing the iterative recovery technique using the time from the first time source, wherein the fourth threshold is greater than the third threshold.

18. The system of claim 17, wherein the fourth threshold is greater than the third threshold.

* * * * *